(12) United States Patent
Yachida

(10) Patent No.: US 9,460,119 B2
(45) Date of Patent: Oct. 4, 2016

(54) INFORMATION PROCESSING DEVICE, INFORMATION PROCESSING METHOD, AND RECORDING MEDIUM

(71) Applicant: NEC Corporation, Minato-ku, Tokyo (JP)

(72) Inventor: Shoji Yachida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/437,888

(22) PCT Filed: Oct. 10, 2013

(86) PCT No.: PCT/JP2013/006039
§ 371 (c)(1),
(2) Date: Apr. 23, 2015

(87) PCT Pub. No.: WO2014/064897
PCT Pub. Date: May 1, 2014

(65) Prior Publication Data
US 2015/0278250 A1  Oct. 1, 2015

(30) Foreign Application Priority Data
Oct. 25, 2012 (JP) ................................. 2012-235336

(51) Int. Cl.
*G06K 9/46* (2006.01)
*G06F 17/30* (2006.01)
(Continued)

(52) U.S. Cl.
CPC ......... *G06F 17/30259* (2013.01); *G06F 3/002* (2013.01); *G06F 3/0304* (2013.01); *G06F 17/30* (2013.01); *G06K 9/52* (2013.01); *H04N 7/18* (2013.01)

(58) Field of Classification Search
None
See application file for complete search history.

(56) References Cited

U.S. PATENT DOCUMENTS 6,556,783 B1 * 4/2003 Gelphman ............. H04N 5/232
348/E5.042
8,330,801 B2 * 12/2012 Wang ....................... G06K 9/20
345/419

(Continued)

FOREIGN PATENT DOCUMENTS

JP   2003036212 A   2/2003
JP   2005031827 A   2/2005

(Continued)

OTHER PUBLICATIONS

International Search Report for PCT Application No. PCT/JP2013/006039, mailed on Jan. 14, 2014.

(Continued)

*Primary Examiner* — Daniel Mariam

(57) ABSTRACT

An image collation unit determines whether input image data matches pre-registered image data or a feature quantity of the input image data matches a pre-registered feature quantity of the image data, and stores in a memory at least one of input image data which is determined to match and information which represents the input image data. A complexity computing unit computes complexity of the image data. An image flatness determination unit determines, on the basis of the computed complexity of the image data, whether the image data is data which denotes a flat image. An information processing execution unit executes, when it is determined that newly input image data is data which denotes a flat image and the input image data or the information which represents the input image data is stored in the memory, information processing specified by the input image data and the like stored in the memory.

10 Claims, 8 Drawing Sheets

(51) Int. Cl.
*G06F 3/00* (2006.01)
*G06F 3/03* (2006.01)
*G06K 9/52* (2006.01)
*H04N 7/18* (2006.01)

(56) References Cited

U.S. PATENT DOCUMENTS

2006/0262848 A1* 11/2006 Togita .................... H04N 19/61
375/240.03
2009/0274368 A1* 11/2009 Watanabe .......... G06K 9/00221
382/167

FOREIGN PATENT DOCUMENTS

| | | |
|---|---|---|
| JP | 2006145616 A | 6/2006 |
| JP | 2007259134 A | 10/2007 |
| JP | 2010217962 A | 9/2010 |
| JP | 2012050148 A | 3/2012 |
| JP | 2012059263 A | 3/2012 |

OTHER PUBLICATIONS

English Translation of write opinion for PCT Application No. PCT/JP2013/006039.

* cited by examiner (a)

(b)

INFORMATION PROCESSING DEVICE, INFORMATION PROCESSING METHOD, AND RECORDING MEDIUM

REFERENCE TO RELATED APPLICATION

The present application is a National Stage Entry of PCT/JP2013/006039 filed on Oct. 10, 2013, which is based on and claims the benefit of the priority of Japanese Patent Application No. 2012-235336, filed on Oct. 25, 2012, the disclosures of all of which are incorporated herein in their entirety by reference.

TECHNICAL FIELD

The present invention relates to an information processing device, an information processing method, and a recording medium, which execute information processing using an image photographed using a camera.

BACKGROUND ART

In recent years, a variety of user interfaces for performing information processing have been proposed. As one example thereof, a near field wireless communication technology such as NFC (Near Field Communication) is sometimes used. For example, by moving a wireless communication terminal using NFC closer to a predetermined object, an application is activated and information associated with a position to which the terminal is moved closer is displayed.

PTL 1 describes a personal digital assistance which simplifies Internet access processing and retrieval processing of Web pages. The personal digital assistance described in PTL 1 includes a detection means for detecting a logo mark including a graphic or a character, and stores registration data which registers a Web page address corresponding to the logo mark. When an image inputted from a camera detects the registered logo mark, the personal digital assistance described in PTL 1 accesses the pre-registered Web page address.

PTL 2 describes an image display device which provides good visibility even in a situation where vibration occurs in the device. The image display device described in PTL 2, vibration applied with respect to the image display device is detected, and a display position of an image to be displayed on a display unit is moved in the opposite direction of the movement of the vibration.

In PTL 3, a portable telephone device which decreases a consumption current during a voice call is described. In the device described in PTL 3, the state where the portable telephone device is disposed in the vicinity of user's ear is detected on the basis of the brightness or the outline of image data which a camera unit obtains.

In PTL 4, a camera-equipped mobile terminal device which calls a function using an image generated by the camera is described. The camera-equipped mobile terminal device described in PTL 4 detects a feature which an application sets as a processing target, from a preview image obtained by the camera. Regarding all applications which set the detected feature as a processing target, each of them sets a state of receiving selection operation, and information which indicates the function and a method of the selection operation is displayed on a display unit in each of these applications.

In PTL 5, a portable telephone which can be easily found at an incoming call in the case of being placed on a desk, a floor, or the like is described. The portable telephone described in PTL 5 detects a state where the terminal is placed on a floor or a desk with a back camera, and changes a notifying method at an incoming call by the detection.

CITATION LIST

Patent Literature

PTL 1: Japanese Unexamined Patent Application Publication No. 2003-036212
PTL 2: Japanese Unexamined Patent Application Publication No. 2006-145616
PTL 3: Japanese Unexamined Patent Application Publication No. 2007-259134
PTL 4: Japanese Unexamined Patent Application Publication No. 2010-217962
PTL 5: Japanese Unexamined Patent Application Publication No. 2012-050148

SUMMARY OF INVENTION

Technical Problem

Furthermore, in recent years, information terminals such as a smartphone and a tablet PC are becoming more and more popular, and a variety of applications behave with information terminals which are operated on a palm. An information terminal like this is often sold in a state where applications are included (bundled state). At this time, if the number of the included applications and the number of applications which are bought thereafter are increased, icons for activating the applications are not fit in a screen of the information terminal. As a result, there was a problem in that icons of a variety of applications are displayed on multiple pages, and a lot of time is spent to search an icon for activating an intended application.

On the other hand, it is possible to reduce time for activating an application by using the device described in PTL 1. However, in the device described in PTL 1, there was a problem in that detection of a pre-registered image causes a jump to a Web page registered for the detected image regardless of user's intentions.

It is an object of the present invention to provide an information processing device, an information processing method, and an information processing program, which can performs, in the case where an executive instruction of information processing is performed using an image, the executive instruction which further reflects user's intentions.

Solution to Problem

An information processing device according to the present invention includes: a camera image input unit configured to input imaged image data; an image collation unit configured to determine whether or not input image data inputted by the camera image input unit matches pre-registered image data or a feature quantity of the input image data matches a pre-registered feature quantity of the image data, and stores in a memory at least one of input image data which is determined to match and information which represents the input image data; a complexity computing unit configured to compute complexity of the image data; an image flatness determination unit configured to determine, on the basis of the computed complexity of the image data, whether or not the image data is data which denotes a flat image; and an information processing execution unit configured to execute, when it is determined by the image flatness determination means that newly input image data is data which denotes a flat image and the input image data or the information which represents the input image data is stored in the memory, information processing specified by the input image data or the information which represents the input image data stored in the memory.

An information processing method according to the present invention includes: determining whether or not input image data from a camera image input unit which inputs imaged image data matches pre-registered image data or a feature quantity of the input image data matches a pre-registered feature quantity of the image data; storing in a memory at least one of input image data which is determined to match and information which represents the input image data; computing complexity of the image data; determining, on the basis of the computed complexity of the image data, whether or not the image data is data which denotes a flat image; and executing, when it is determined that newly input image data is data which denotes a flat image and the input image data or the information which represents the input image data is stored in the memory, information processing specified by the input image data or the information which represents the input image data stored in the memory.

A non-transitory computer readable recording medium according to the present invention stores an information processing program which causes a computer to execute: image collation processing for determining whether or not input image data from a camera image input unit which inputs imaged image data matches pre-registered image data or a feature quantity of the input image data matches a pre-registered feature quantity of the image data, and storing in a memory at least one of input image data which is determined to match and information which represents the input image data; complexity computing processing for computing complexity of the image data; image flatness determination processing for determining, on the basis of the computed complexity of the image data, whether or not the image data is data which denotes a flat image; and information processing execution processing for executing, when it is determined that newly input image data is data which denotes a flat image in the image flatness determination processing and the input image data or the information which represents the input image data is stored in the memory, information processing specified by the input image data or the information which represents the input image data stored in the memory.

Advantageous Effects of Invention

According to the present invention, in the case where an executive instruction of information processing is performed using an image, the executive instruction which further reflects user's intentions can be performed.

DESCRIPTION OF EMBODIMENTS

First, an operation method using an information processing device of the present invention will be described. A user of the information processing device first starts to photograph an object associated with an application which he/she wants to activate or an object whose additional information he/she wants to obtain. When the intended object can be photographed, the user moves the information processing device toward the object. Since the content of the image to be photographed is changed by the movement, when the change is detected, the activation of the application or the presentation of the additional information of the object is performed. These operations are those executing information processing using an image, and furthermore, can be said to be operations which further reflect user's intentions. Hereinafter, exemplary embodiments of the present invention will be described with reference to the drawings.

Exemplary Embodiment 1

Figure 1:
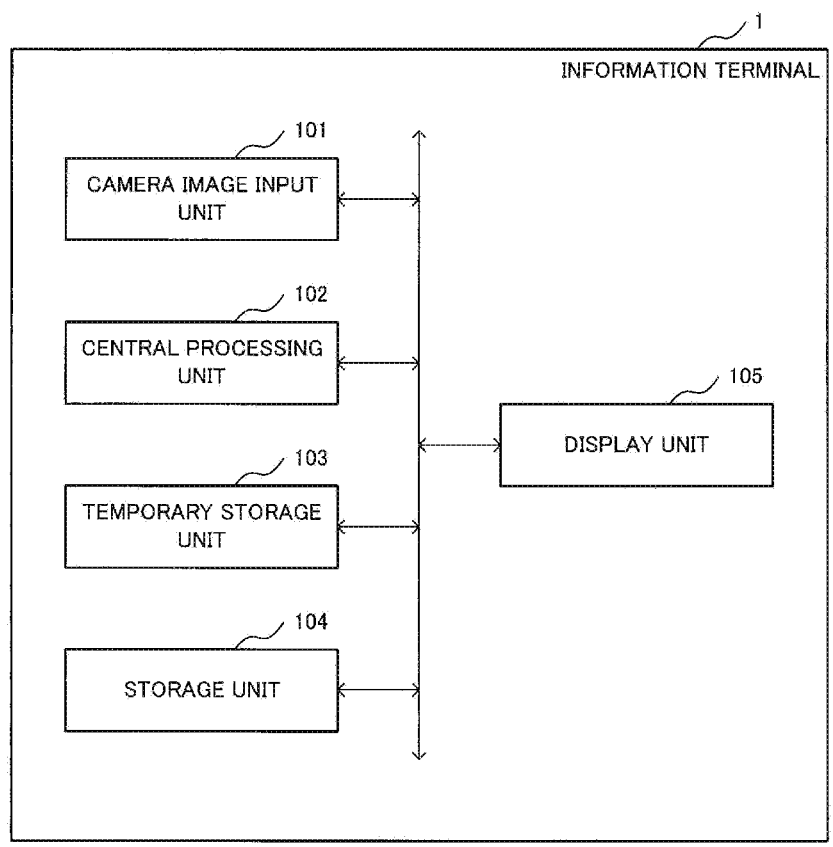
FIG. 1 is a block diagram illustrating a configuration example of a first exemplary embodiment of an information processing device according to the present invention.

FIG. 1 is a block diagram illustrating a configuration example of a first exemplary embodiment of an information processing device according to the present invention. Hereinafter, the information processing device of the present exemplary embodiment will be referred to as an information terminal. The information terminal 1 of the present exemplary embodiment includes a camera image input unit 101, a central processing unit 102, a temporary storage unit 103, a storage unit 104, and a display unit 105. The information terminal 1 is a device for providing various types of applications and additional information to a user.

The camera image input unit 101 inputs an image into the information terminal 1. The camera image input unit 101 is achieved by, for example, an imaging device such as a camera, and inputs an image photographed by the imaging device into the information terminal. Hereinafter, an image inputted by the camera image input unit 101 is sometimes referred to as a camera image or an input image. In addition, depending on the input form, data indicating an image to be inputted is sometimes referred to as input image data or camera image data.

The central processing unit 102 performs various types of information processing. Specifically, the central processing unit 102 performs image processing of the inputted camera image, behavior processing based on the application, presentation processing of the additional information, and the like. The processing performed by the central processing unit 102 will be described below.

The temporary storage unit 103 temporarily stores the computing result by the central processing unit 102 and the input image. The storage unit 104 stores a pre-registered image feature, an executable file of the application, and the like. The temporary storage unit 103 and the storage unit 104 are achieved by, for example, a memory, a magnetic disk device, and the like. The temporary storage unit 103 and the storage unit 104 are achieved by separate devices in the present exemplary embodiment, but the temporary storage unit 103 and the storage unit 104 may be collectively achieved by one device. In addition, a storage area which the temporary storage unit 103 and the storage unit 104 store may be divided into a plurality of storage areas and the respective divided storage areas may store information having different contents.

The display unit 105 displays the input image, the computing result, the execution result of the application, the presenting additional information, and the like. The display unit 105 is achieved by, for example, a touch panel device, a display device, and the like.

Hereinafter, a behavior of the central processing unit 102 will be described. The central processing unit 102 determines whether or not input image data inputted by the camera image input unit 101 matches pre-registered image data or a feature quantity of the input image data matches a pre-registered feature quantity of the image data. Then, the central processing unit 102 stores in the temporary storage unit 103 at least one of the input image data which is determined to match and information which represents the input image data. Hereinafter, this processing is sometimes referred to as image collation processing P101.

As the information which represents the input image data, a name of an application associated with the input image may be used, and a name of an object specified by the input image may be used.

Specifically, the central processing unit 102 computes a feature quantity of the image data inputted from the camera image input unit 101. Then, the central processing unit 102 compares the computed feature quantity with a pre-registered feature quantity, detects an image whose feature quantity matches from the storage unit 104, and stores the detection result in the temporary storage unit 103. The feature quantity compared with the feature quantity of the input image is, for example, stored in the storage unit 104.

The central processing unit 102 may store in the temporary storage unit 103 not only the input image which is determined to match but also the determination result which determines that the feature quantity of the inputted image data matches the feature quantity of the pre-registered image (hereinafter, also referred to as an image collation result). In addition, the image collation result may include information of a link destination of the registered image and information which indicates other image information. In addition, the image collation result may include information which represents the input image data.

As a method for computing the feature quantity of the image data, the central processing unit 102 may use, for example, any feature quantity computing method, such as SIFT (Scale-Invariant Feature Transform) feature, HOG (Histograms of Oriented Gradients) feature, and SURF (Speed-Up Robust Features) feature.

In addition, the central processing unit 102 may determine that the feature quantities match when the feature quantities of both image data completely match, and may determine that the feature quantities match also when a difference between the feature quantities of both image data is within a predetermined range.

In addition, the central processing unit 102 computes complexity of the image data, and determines, on the basis of the computed complexity of the image data, whether or not the image data is data which denotes a flat image. The complexity of the image data is a degree which indicates the complicatedness of a design of an image, and is also called activity. For example, in an image photographed in a focus error state and an image photographed in a blackout state, the complexity becomes small.

Specifically, the image data is continually inputted from the camera image input unit 101, and thus, the central processing unit 102 computes activity of the input image data and compares the computed activity with a preset threshold value so as to detect a flat image. Hereinafter, this processing is sometimes referred to as image processing P102.

In general, activity can be represented by a mean square of a difference of pixel values (luminance values) of neighboring pixels. Therefore, the central processing unit 102 may compute the mean square of the difference of the pixel values between the pixels as the activity. However, this computing method is one example of a method for computing the activity, and the activity may be computed by using another method.

For example, when the luminance value is represented by 8 bits, the threshold value may be set to be about ½₀ of a total scale value (specifically, 13 or less).

Then, the central processing unit 102 determines whether or not the inputted image data becomes a flat image. Hereinafter, this processing is sometimes referred to as image flatness determination processing P103. When the above-described mean square is equal to or less than the preset threshold value, the central processing unit 102 may determine that the targeted image becomes flat.

On the other hand, the central processing unit 102 determines whether or not the image collation result is stored in the temporary storage unit 103. More specifically, that the image collation result is stored in the temporary storage unit 103 indicates that the input image which matches the registered image is inputted into the information terminal. Hereinafter, this processing is sometimes referred to as collation result confirmation processing P104.

Then, when it is determined that newly input image data is data which denotes a flat image and the input image data or the information which represents the input image data is stored in the temporary storage unit 103, the central processing unit 102 executes information processing specified by the input image data or the information which represents the input image data stored in the temporary storage unit 103.

Specifically, when it is determined that the input image data becomes a flat image and the image collation result already exists in the temporary storage unit 103, the central processing unit 102 may activate an application associated with the input image data which corresponds to the latest image collation result. In addition, in this case, the central processing unit 102 may present additional information of the input image data. Hereinafter, this processing is sometimes referred to as associated application activation processing P105.

The central processing unit 102 is achieved by a CPU of a computer which behaves in accordance with a program (information processing program). For example, a program is stored in a storage unit (not shown in the drawing) of the information terminal 1, and a CPU may read the program and behave as the central processing unit 102 in accordance with the program.

Figure 2:
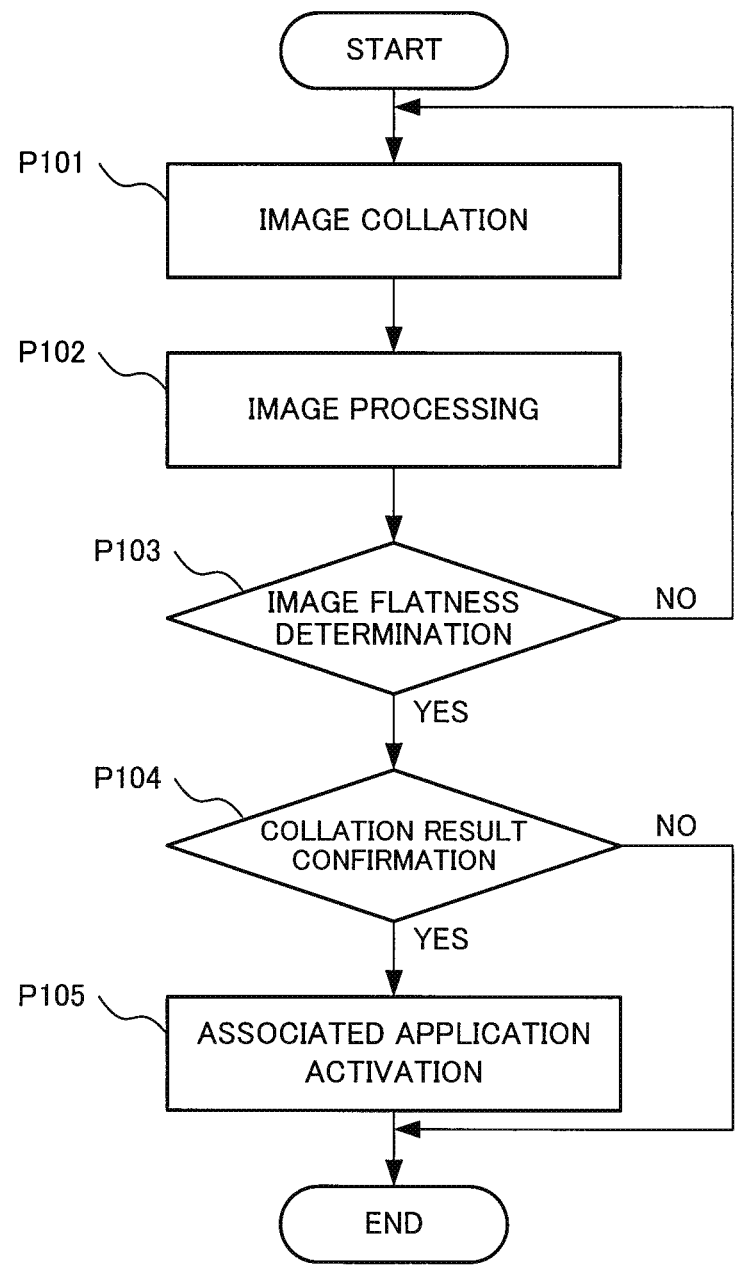
FIG. 2 is a flowchart illustrating a behavior example of the information processing device of the first exemplary embodiment.

Next, a behavior of the present exemplary embodiment will be described. FIG. 2 is a flowchart illustrating a behavior example of the information processing device of the present exemplary embodiment.

When input data is inputted from the camera image input unit 101, the central processing unit 102 determines whether or not the input image data matches pre-registered image data or a feature quantity of the input image data matches a pre-registered feature quantity of the image data, and performs image collation processing for storing in the temporary storage unit 103 the input image data which is determined to match, image collation information, and the like (Step P101).

Next, the central processing unit 102 performs image processing which computes complexity of the input image data (Step P102).

Then, the central processing unit 102 performs image flatness determination processing which determines, on the basis of the computed complexity of the image data, whether or not the image data is data which denotes a flat image (Step P103).

When it is determined that the newly input image is not a flat image (NO at Step P103), processing after Step P101 is repeated. On the other hand, when it is determined that the input image is a flat image (YES at Step P103), the central processing unit 102 performs collation result confirmation processing which confirms whether or not the image collation information is stored in the temporary storage unit 103 (Step P104).

When the image collation information is not stored in the temporary storage unit 103 (NO at Step P104), the central processing unit 102 terminates the processing. On the other hand, when the image collation information is stored in the temporary storage unit 103 (YES at Step P104), the central processing unit 102 performs associated application activation processing which executes information processing specified by the image collation information stored in the temporary storage unit 103 (Step P105).

As described above, according to the present exemplary embodiment, when the camera image input unit 101 inputs the imaged image data, the central processing unit 102 determines whether or not the input image data matches the pre-registered image data (or the feature quantity of the input image data matches the pre-registered feature quantity of the image data), and stores in the temporary storage unit 103 the image collation information which represents the content of the input image data which is determined to match. In addition, the central processing unit 102 computes the complexity of the image data, and determines, on the basis of the computed complexity of the image data, whether or not the image data is data which denotes a flat image. Accordingly, when it is determined that the newly input image data is data which denotes a flat image and the image collation information is stored in the temporary storage unit 103, the central processing unit 102 executes information processing specified by the image collation information which represents the content of the input image data stored in the temporary storage unit 103.

Therefore, in the case where an executive instruction of information processing is performed using an image, the executive instruction which further reflects user's intentions can be performed. According to the present exemplary embodiment, a series of operations in which an object is photographed and the information terminal 1 is moved closer to the object can be recognized as an operation for executing an application.

Hereinafter, an operation of the information terminal of the present exemplary embodiment and a behavior of the information terminal by the operation will be described.

First, an operator refers to a plane of paper, and photographs an icon and a position describing a behavior explanation of an application associated with the icon, with a camera. The information terminal computes an image feature from image data at the photographed position, and collates it with an image feature stored inside the information terminal. When determining that an image having a close image feature exists, the information terminal temporarily stores image collation information which represents an application name or the like, as a collation result.

Next, the operator performs an operation to move the information terminal closer to the plane of paper. In that case, the camera becomes less able to focus, and thus, activity of the input image is decreased (specifically, activity of the input image becomes equal to or less than a predetermined threshold value). When the activity of the input image becomes equal to or less than the threshold value, the information terminal determines that a behavior to place or move the information terminal on or closer to the plane of paper is performed by the operator, and activates an application specified by the temporarily-stored image collation information.

The information terminal behaves in this manner so that the operator can activate an application which is pre-installed in the information terminal by moving or placing the information terminal closer to or on the plane of paper on which an image of an application which he/she wants to activate is drawn. Therefore, an intended application needs not to be found from a large number of applications, and it becomes possible to easily perform an operation to activate an application of the information terminal.

In a general information terminal, an application is activated by specifying an icon. In the present exemplary embodiment, it can be said that the registered image data plays a role of an icon to activate an application. As an image which plays a role of the icon, a user can define an arbitrary mark.

Exemplary Embodiment 2

Figure 3:
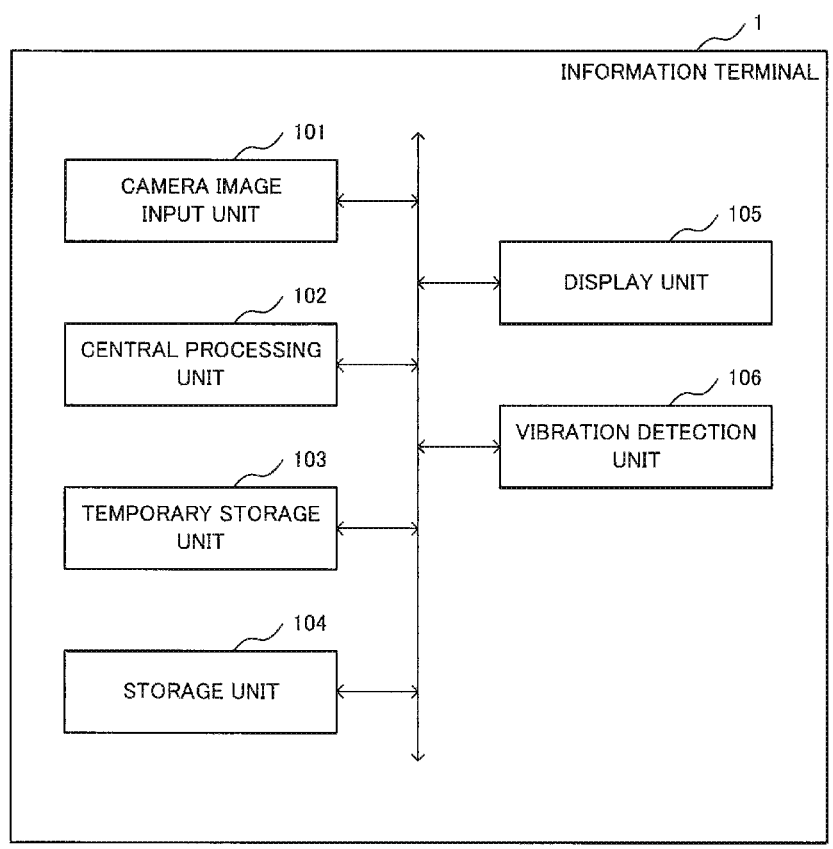
FIG. 3 is a block diagram illustrating a configuration example of a second exemplary embodiment of the information processing device according to the present invention.

FIG. 3 is a block diagram illustrating a configuration example of a second exemplary embodiment of the information processing device according to the present invention. The same configurations as the first exemplary embodiment are denoted by the same reference numerals as those in FIG. 1, and the description is omitted. Hereinafter, the information processing device of the present exemplary embodiment will also be referred to as an information terminal. The information terminal 1 of the present exemplary embodiment includes the camera image input unit 101, the central processing unit 102, the temporary storage unit 103, the storage unit 104, the display unit 105, and a vibration detection unit 106. More specifically, the information terminal of the present exemplary embodiment differs from the information terminal of the first exemplary embodiment in further including the vibration detection unit 106.

The vibration detection unit 106 detects a movement of the information terminal 1. For example, the vibration detection unit 106 inputs a signal indicating the detected vibration (vibration signal) into the central processing unit 102. The vibration detection unit 106 is achieved by, for example, an acceleration sensor or the like. However, a form of the vibration detection unit 106 is not limited to the acceleration sensor as long as it can detect a behavior state of the information terminal 1. A method for detecting vibration is well known, and therefore, the detailed description is omitted here.

The central processing unit 102 of the present exemplary embodiment determines whether or not the information terminal 1 (specifically, camera image input unit 101) is in a rest state. The central processing unit 102 may determine that the information terminal 1 is in the rest state, on the basis of the vibration signal inputted from the vibration detection unit 106. The central processing unit 102 may determine that the information terminal 1 is in the rest state not only when the information terminal 1 comes to rest completely but also when the vibration is within a preset range (more specifically, when the information terminal 1 is in a nearly rest state). Hereinafter, this processing is sometimes referred to as terminal rest state determination processing P106.

In the present exemplary embodiment, when it is determined that newly input image data is data which denotes a flat image and it is determined that the camera image input unit 101 is in the rest state, the central processing unit 102 executes information processing specified by the input image data or the information which represents the input image data stored in the temporary storage unit 103.

Specifically, the central processing unit 102 executes the present processing in the associated application activation processing P105 shown in the first exemplary embodiment. More specifically, when it is determined that the input image data becomes a flat image, it is determined that the information terminal 1 is in the rest state, and furthermore, the image collation result exists in the temporary storage unit 103, the central processing unit 102 may activate an application associated with the input image data which corresponds to the latest image collation result. In addition, in this case, the central processing unit 102 may present additional information of the input image data.

When a moving object is photographed with a camera, blurring or an afterimage called a motion blur may occur. It is known that an image photographed when a movement is active or a camera-shaken image causes an extremely blurred image. In this case, it can be determined that the image like this becomes a flat image in the image flatness determination processing P103. However, in the present exemplary embodiment, the vibration detection unit 106 detects a vibration. Therefore, it is possible to control such that the activation of an application associated with a collation result image is not performed when the information terminal moves actively, and an erroneous operation of the information terminal can be prevented.

Figure 4:
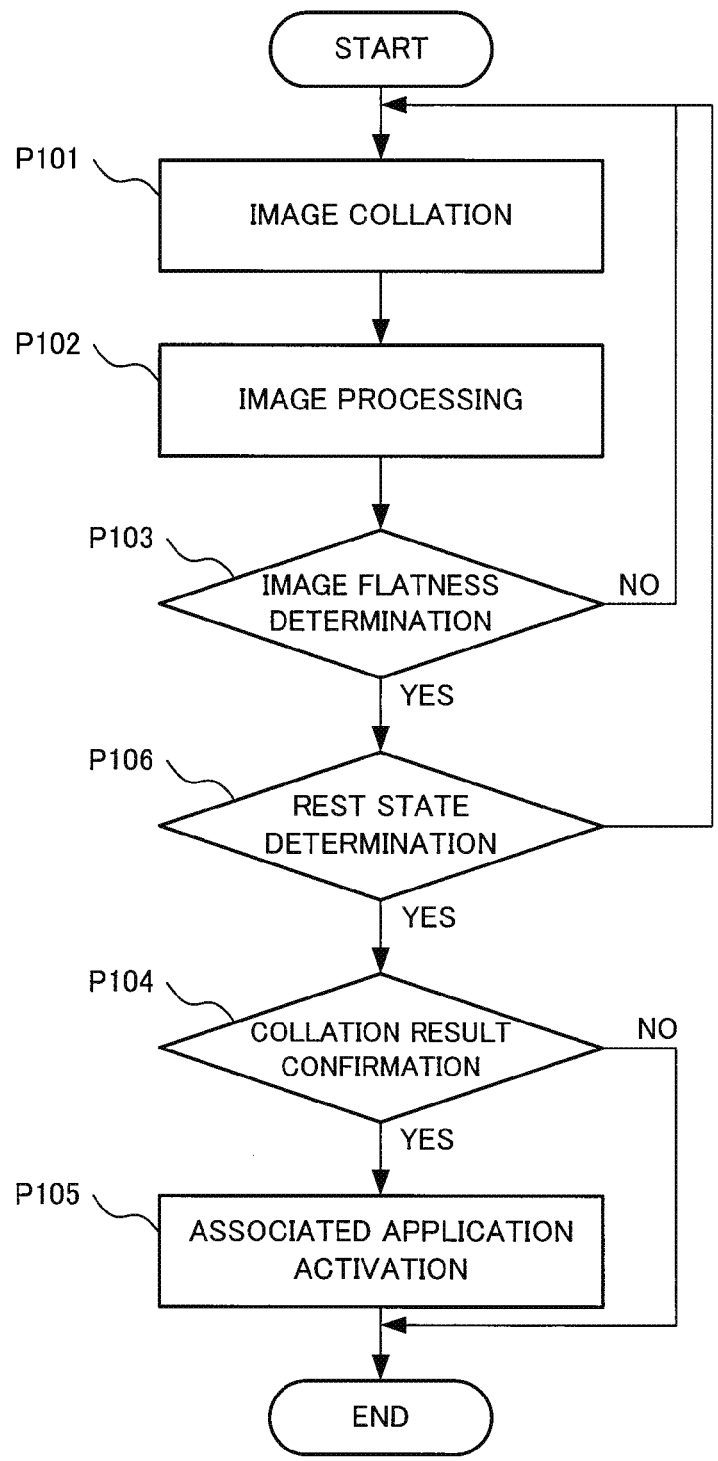
FIG. 4 is a flowchart illustrating a behavior example of the information processing device of the second exemplary embodiment.

Next, a behavior of the present exemplary embodiment will be described. FIG. 4 is a flowchart illustrating a behavior example of the information processing device of the present exemplary embodiment. Processing from the image collation processing until computing the complexity to determine whether or not the image is flat is the same as the processing from Step P101 to Step P103 illustrated in FIG. 2.

When it is determined that the inputted image is a flat image (YES at Step P103), the central processing unit 102 determines whether or not the information terminal 1 is in the rest state (Step P106). When it is determined that the information terminal 1 is not in the rest state (NO at Step P106), processing after Step P101 is repeated. On the other hand, when it is determined that the information terminal 1 is in the rest state (YES at Step P106), the collation result confirmation processing and the associated application activation processing illustrated by Step P104 and Step P105 are performed.

In the flowchart illustrated in FIG. 4, the case where the terminal rest state determination processing P106 which determines whether or not the information terminal 1 is in the rest state is performed after performing the image flatness determination processing P103 which determines whether or not the image is flat was illustrated. However, the image flatness determination processing P103 may be performed after performing the terminal rest state determination processing P106. Specifically, the central processing unit 102 may perform the image flatness determination processing P103 when it is determined that, in the terminal rest state determination processing P106, the information terminal 1 is in the rest state.

As described above, according to the present exemplary embodiment, the central processing unit 102 determines whether or not the information terminal 1 is in the rest state, on the basis of the vibration detected by the vibration detection unit 106. Then, when it is determined that the newly input image data is data which denotes a flat image and it is determined that the information terminal 1 is in the rest state, the central processing unit 102 executes information processing specified by the image collation information which represents the content of the input image data stored in the temporary storage unit 103.

Therefore, since an image change due to blurring can be detected in addition to the effect of the first exemplary embodiment, a malfunction of the information terminal 1 can be prevented. In addition, according to the present exemplary embodiment, a series of operations in which an object is photographed and the information terminal 1 is moved closer to the object and stopped can be recognized as an operation for executing an application.

Exemplary Embodiment 3

Figure 5:
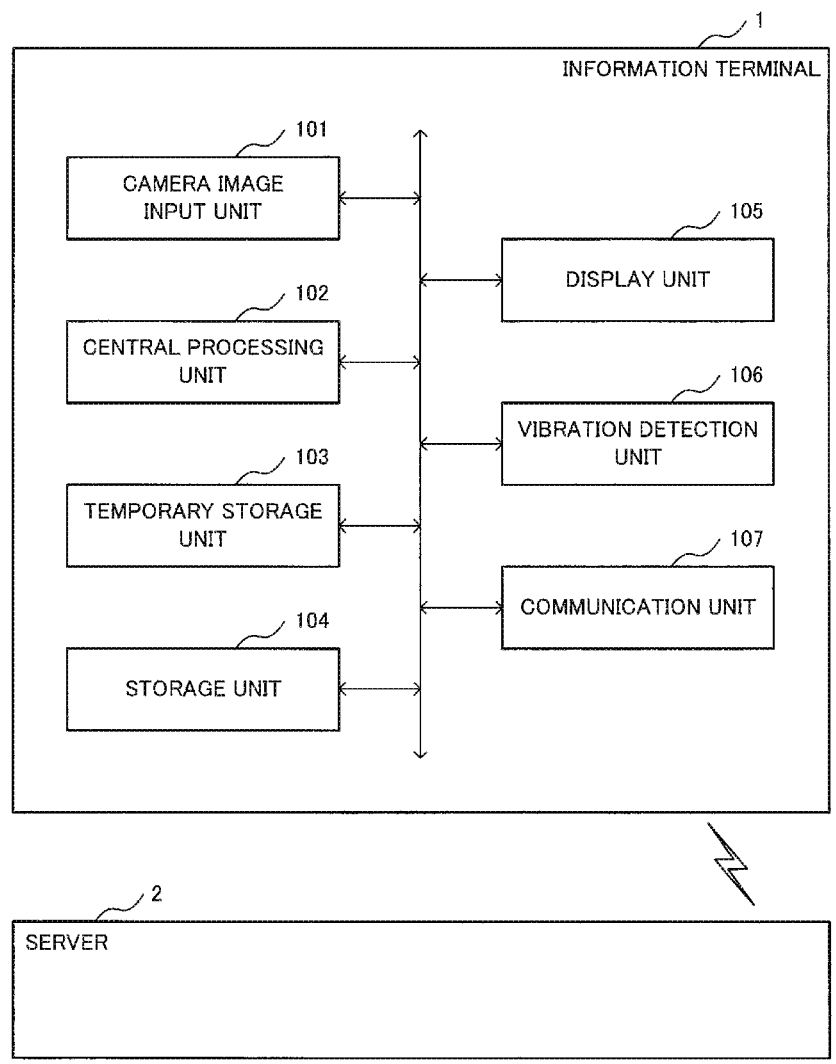
FIG. 5 is a block diagram illustrating a configuration example of a third exemplary embodiment of the information processing device according to the present invention.

FIG. 5 is a block diagram illustrating a configuration example of a third exemplary embodiment of the information processing device according to the present invention. The same configurations as the second exemplary embodiment are denoted by the same reference numerals as those in FIG. 3, and the description is omitted. Hereinafter, the information processing device of the present exemplary embodiment will also be referred to as an information terminal. The information terminal 1 of the present exemplary embodiment includes the camera image input unit 101, the central processing unit 102, the temporary storage unit 103, the storage unit 104, the display unit 105, the vibration detection unit 106, and a communication unit 107. More specifically, the information terminal of the present exemplary embodiment differs from the information terminal of the second exemplary embodiment in further including the communication unit 107.

The communication unit 107 connects the information terminal 1 with a server 2 through a communication network. The server 2 is a device capable of retrieving various types of information required when the information terminal 1 performs information processing on the basis of an image to be inputted. The server 2 is a device capable of performing larger-scale retrieval than the information terminal 1, and thus, can retrieve relevant information also from an image which is not registered in the information terminal 1. Specifically, in the server 2, retrieval of a related application and related information is largely performed.

In the descriptions of the first exemplary embodiment and the second exemplary embodiment, the case where the central processing unit 102 stores in the temporary storage unit 103 the input image data which matches the pre-registered image data (the feature quantity of the input image data matches the pre-registered feature quantity of the image data) was described. In the present exemplary embodiment, when it is determined that the information terminal 1 is in the rest state even in the input image data which is not determined to match, the central processing unit 102 temporarily stores the input image data. Hereinafter, the input image data is sometimes referred to as temporarily-stored data. In addition, hereinafter, this processing is sometimes referred to as image storage processing P107.

The central processing unit 102 may store, for example, the temporarily-stored data in the temporary storage unit 103. In this case, the central processing unit 102 may store the input image data which is determined to match and the temporarily-stored data in separate regions.

In the present exemplary embodiment, when it is determined that newly input image data is data which denotes a flat image and the input image data or the information which represents the input image data (specifically, image collation information) is not stored in the temporary storage unit 103, the central processing unit 102 transmits the temporarily-stored input image data (temporarily-stored data) to the server 2. Hereinafter, this processing is sometimes referred to as image transmission processing P108.

The server 2 notifies information required for the information terminal 1 to execute information processing to the information terminal 1 on the basis of the notified temporarily-stored data. Examples of the information required for executing information processing include a name of an application which the information terminal 1 is made to execute, information which describes the content of the notified temporarily-stored data, and the like. Hereinafter, this processing is sometimes referred to as image retrieval processing P110.

Then, the central processing unit 102 executes information processing specified by the information notified from the server 2. For example, when the application name is notified from the server 2, the central processing unit 102 may activate the application. In addition, for example, when the information which describes the content of the temporarily-stored data is notified from the server 2, the central processing unit 102 may display the information.

In the image processing P102 which determines whether or not the image data is data which denotes a flat image, when the temporarily-stored data does not exist, and furthermore, the image collation information does not also exist, the central processing unit 102 may perform the image processing P102 again, or may terminate the processing itself.

In addition, in the above-described description, regarding the input image data which is not determined to match, the case where the central processing unit 102 temporarily stores the input image data itself was described. In addition, the central processing unit 102 may compute a feature quantity of the input image data, and temporarily store the feature quantity. In this case, the central processing unit 102 may transmit the feature quantity to the server 2 to obtain necessary information.

Figure 6:
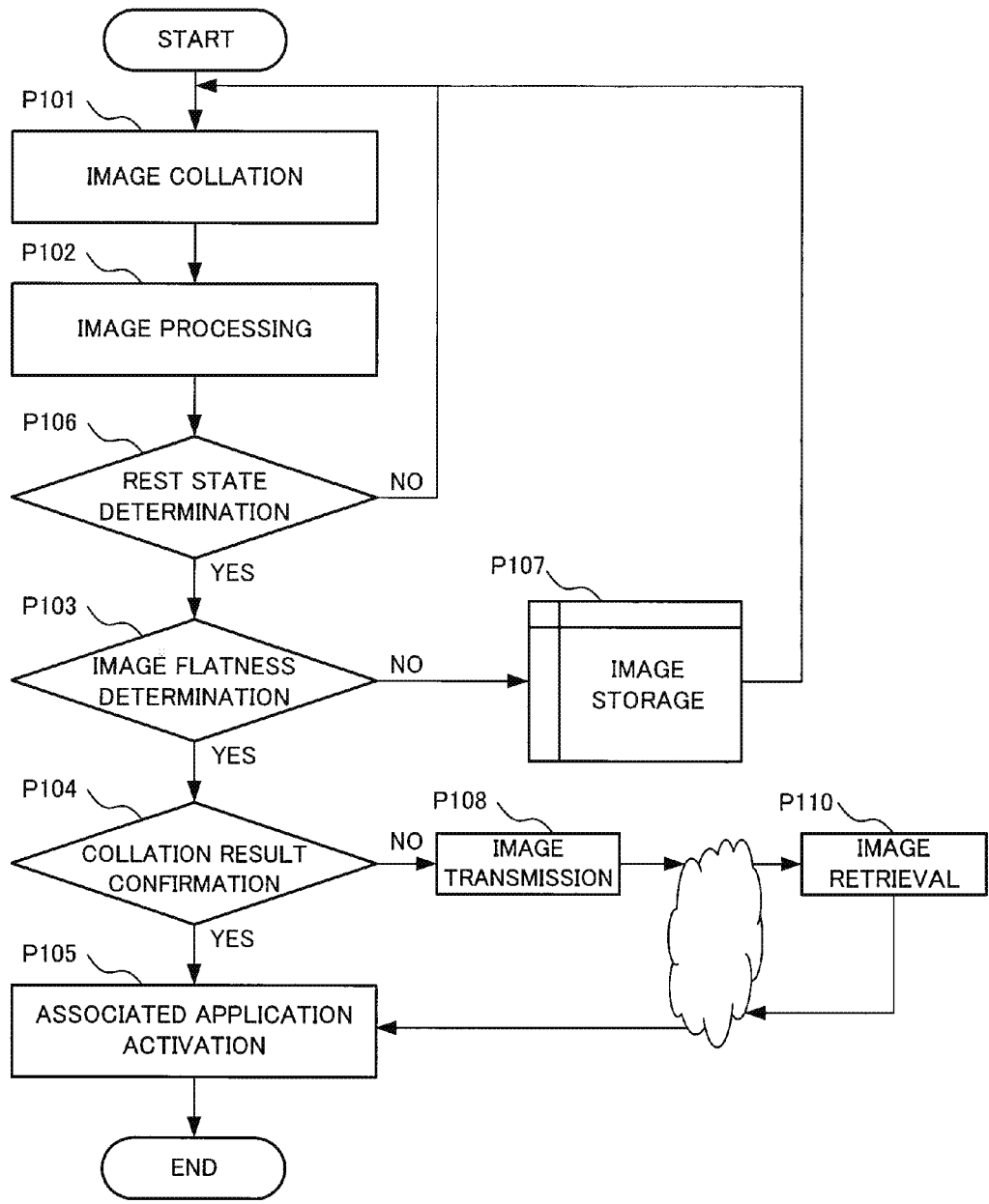
FIG. 6 is a flowchart illustrating a behavior example of the information processing device of the third exemplary embodiment.

Next, a behavior of the present exemplary embodiment will be described. FIG. 6 is a flowchart illustrating a behavior example of the information processing device of the present exemplary embodiment. Processing from the image collation processing until computing the complexity is the same as the processing from Step P101 to Step P102 illustrated in FIG. 2.

Next, the central processing unit 102 performs the terminal rest state determination processing which determines whether or not the information terminal 1 is in the rest state (Step P106). When it is determined that the information terminal 1 is not in the rest state (NO at Step P106), processing after Step P101 is repeated. On the other hand, when it is determined that the information terminal 1 is in the rest state (YES at Step P106), the central processing unit 102 performs the image flatness determination processing which determines, on the basis of the computed complexity of the image data, whether or not the image data is data which denotes a flat image (Step P103).

When it is determined that the newly input image is not a flat image (NO at Step P103), the central processing unit 102 repeats processing after Step P101 upon temporarily storing the input image (Step P107). It can be said that the input image which is temporarily stored here is an image photographed in the rest state of the information terminal 1 (specifically, image without a motion blur). In addition, when a temporarily-stored image already exists, the central processing unit 102 replaces the stored image with the newly input image to provide the latest image.

On the other hand, when it is determined that the newly input image is a flat image (YES at Step P103), the central processing unit 102 performs the collation result confirmation processing which confirms whether or not the image collation information is stored in the temporary storage unit 103 (Step P104).

When the image collation information is not stored in the temporary storage unit 103 (NO at Step P104), the central processing unit 102 transmits the temporarily-stored image (temporarily-stored data) to the server 2 through the communication network. The server 2 to which the temporarily-stored data is transmitted performs image retrieval processing and notifies information which indicates the retrieval result to the information terminal 1 (Step P110).

When the image collation information is stored in the temporary storage unit 103 (YES at Step P104), or when the information is received from the server 2, the central processing unit 102 executes information processing specified by the image collation information stored in the temporary storage unit 103, or information processing specified by the information notified from the server 2 (Step P105).

As described above, according to the present exemplary embodiment, when it is determined that the information terminal 1 is in the rest state, the central processing unit 102 temporarily stores the input image data (or the feature quantity of the input image data) which is not determined to match the pre-registered image data (or the feature quantity of the image data). Then, when it is determined that the newly input image data is data which denotes a flat image and the input image data or the information which represents the input image data is not stored in the temporary storage unit 103, the central processing unit 102 transmits the temporarily-stored input image data to the server 2, and executes information processing specified by the information notified from the server 2.

Therefore, in addition to the effect of the second exemplary embodiment, even when an image (or a feature quantity of the image) which matches an input image (or a feature quantity of the input image) is not registered in the information terminal 1, information required for information processing can be obtained from the server 2.

Next, one aspect using the information processing device of the present invention will be described. The information processing device described below is an example using the information processing device of the third exemplary embodiment. The case where an application installed on an information terminal 1*a* which a user A owns is used in an information terminal 1*b* which another user B owns will be assumed. It is assumed that, at this time, the user A activates the application installed on the information terminal 1a, on the basis of a description on a certain plane of paper. At this time, when the user B waves the information terminal 1b over the plane of paper used at the time and moves the information terminal 1b closer to the plane of paper, the server 2 is queried through a communication network. The information terminal 1b displays a query screen which indicates whether or not the application is installed, on the basis of the information notified from the server 2. In the case of installing the application, the user B follows instructions on the screen so that it becomes possible to easily own the same application.

In addition, for example, in the case of invoking a calculation function included in the information terminal 1, the information terminal is moved closer to and waved over an actual calculator so that it becomes possible to activate a calculator application. At this time, image data such as a mark which the user decided may be newly registered as an icon. Accordingly, after that, by waving the information terminal 1 over the image, it becomes possible to activate the application which the user wants.

By using this, in the case of selling a certain application, a seal indicating an icon for activating the application is distributed so that it becomes possible to easily guide to an application sales site. In addition, since a user can easily activate the application by waving an information terminal over the distributed seal, the usage frequency of the sales site is increased, and as a result, advantages are likely to be obtained.

Figure 7:
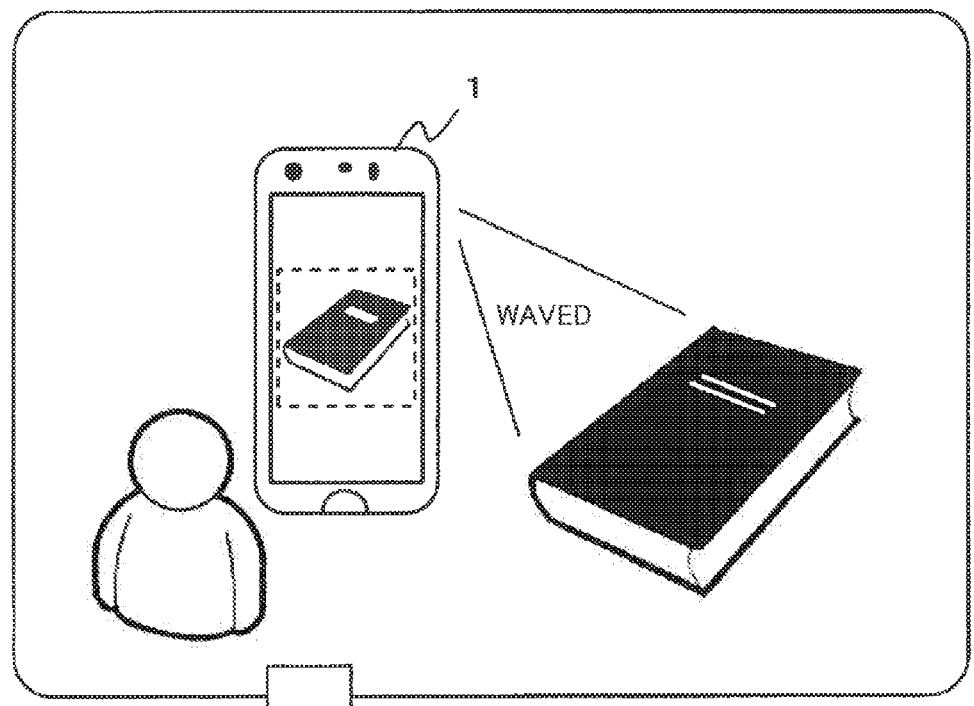
FIG. 7 is an explanatory diagram illustrating an example of a situation where an information processing device illustrated in a specific example is used.
Figure 7:
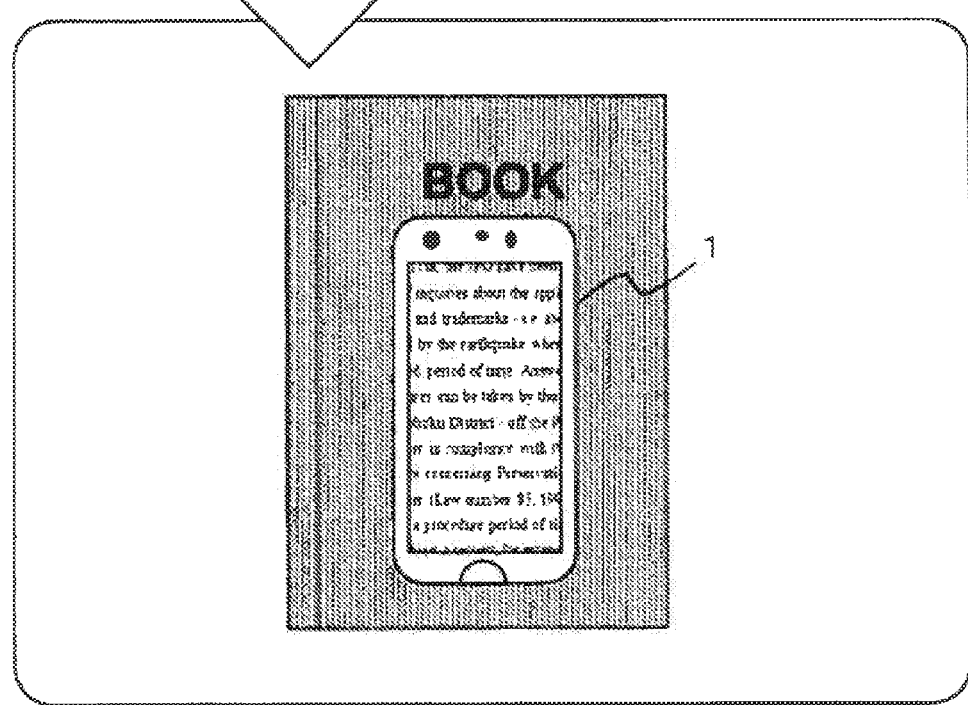

Hereinafter, the present invention will be described by a specific example, but the scope of the present invention is not limited to the content described below. In the present specific example, an operation for activating an application for viewing the contents of books will be described. FIG. 7 is an explanatory diagram illustrating an example of a situation where an information processing device of the present specific example is used. In the information processing device illustrated in FIG. 7, a display device is provided on a surface which a user views, and a camera (not shown in the drawing) is provided on the back side of the display device.

First, the user activates a program of the present invention with the information terminal 1 in a bookstore or a library. Then, as illustrated in (a) of FIG. 7, the user waves the information terminal 1 over a cover of a book or a magazine he/she is interested in to photograph an image of the cover, and temporarily stores the photographed image in the information terminal.

Next, as illustrated in (b) of FIG. 7, when the user places the information terminal 1 such that the camera is in contact with the cover of the book or the magazine, the image which the camera photographs (input image) becomes black. Specifically, by input of the black image, the information terminal 1 determines that a flat image is inputted. Then, the information terminal 1 transmits the image of the cover over which the information terminal 1 was waved to a server in the bookstore or the library.

In the server, image collation is performed between the transmitted image of the cover and a registered image, and electronic book data of the matched book or magazine is returned to the information terminal 1. The information terminal 1 activates an application of an electronic book reader on the basis of the returned data, and displays the electronic book data. Therefore, the user can view the content of the book or the magazine with the information terminal 1 only by placing the information terminal 1 on the cover of the book or the magazine.

Furthermore, the information terminal 1 may be limited such that the electronic book data can be viewed only when the information terminal 1 exists in a predetermined range. For example, the information terminal 1 may be limited such that, if the user completes purchasing at the bookstore or completes a checkout at the library, the electronic book data can be continuously viewed even when being moved out of the area. In addition, the information terminal 1 may be limited such that, if the user does not complete the purchasing or the checkout, the electronic book data is prevented from being viewed out of the area when being moved out of the area.

Figure 8:
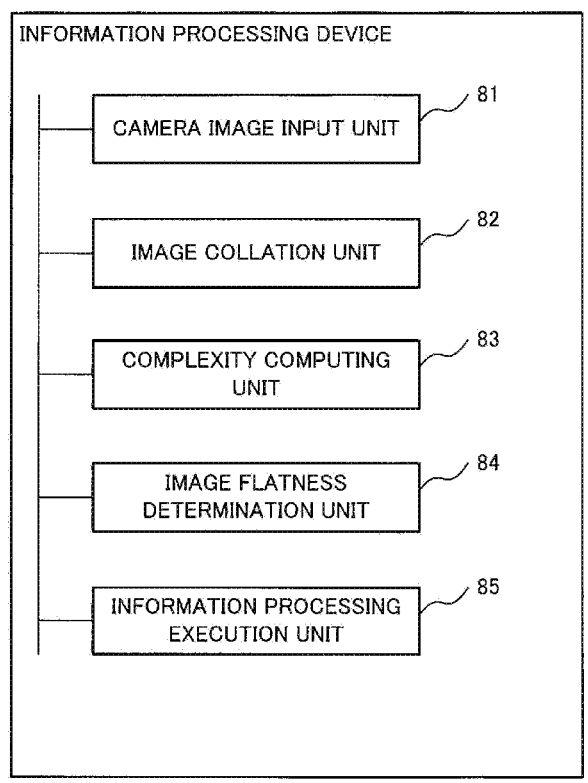
FIG. 8 is a block diagram illustrating an outline of the information processing device according to the present invention.

Next, an outline of the information processing device according to the present invention will be described. FIG. 8 is a block diagram illustrating the outline of the information processing device according to the present invention. The information processing device according to the present invention includes a camera image input unit 81 (for example, camera image input unit 101) which inputs imaged image data, an image collation unit 82 (for example, central processing unit 102) which determines whether or not input image data inputted by the camera image input unit 81 matches pre-registered image data or a feature quantity of the input image data matches a pre-registered feature quantity of the image data, and stores in a memory (for example, temporary storage unit 103) at least one of input image data which is determined to match and information which represents the input image data (for example, image collation information), a complexity computing unit 83 (for example, central processing unit 102) which computes complexity (for example, activity) of the image data, an image flatness determination unit 84 (for example, central processing unit 102) which determines, on the basis of the computed complexity of the image data, whether or not the image data is data which denotes a flat image, and an information processing execution unit 85 (for example, central processing unit 102) which executes, when it is determined by the image flatness determination unit 84 that newly input image data is data which denotes a flat image and the input image data or the information which represents the input image data is stored in the memory, information processing specified by the input image data or the information which represents the input image data stored in the memory (for example, execution processing of application, presentation processing of additional information).

According to such a configuration, in the case where an executive instruction of information processing is performed using an image, the executive instruction which further reflects user's intentions can be performed.

In addition, in general, an information terminal has a large storage capacity and can install a large number of applications. However, when a large number of applications are installed, it tends to become difficult to search an application which one wants to use. Therefore, applications whose behavior outline instructions are not read and which are not used at all are often stored in the information terminal.

In this kind of situation, when a user finds an application which he/she likes while reading an instruction, the application can be activated by placing or moving the information terminal on or closer to that page. Furthermore, in this case, by directly operating the application in accordance with an explanation of the instruction, an effect of capable of easily learning an operation of the application is also obtained. Therefore, applications which occupy a storage unit in the information terminal even though they are not used become effectively utilized.

In addition, the information processing device according to the present invention may include a rest state determination unit (for example, vibration detection unit 106) which determines whether or not the camera image input unit 81 is in a rest state. When it is determined that the newly input image data is data which denotes a flat image and it is determined that the camera image input unit 81 is in the rest state, the information processing execution unit 85 may execute information processing specified by the input image data or the information which represents the input image data stored in the memory.

In addition, when it is determined that the camera image input unit 81 is in the rest state, the image collation unit 82 may temporarily store input image data which is not determined to match or a feature quantity of the input image data (for example, stores temporarily-stored data). When it is determined that the newly input image data is data which denotes a flat image and the input image data or the information which represents the input image data is not stored in the memory, the information processing execution unit 85 may transmit the temporarily-stored input image data to a server (for example, server 2) capable of retrieving various types of information (for example, application name or presenting information) required when the own information processing device (for example, information terminal 1) performs information processing on the basis of an image to be inputted or a feature quantity of the image, and execute information processing specified by information notified from the server.

In addition, the image collation unit 82 may compute the feature quantity of the input image data inputted by the camera image input unit 81, and determine whether or not the feature quantity of the input image data matches the pre-registered feature quantity of the image data.

In addition, when the computed complexity of the image data is equal to or less than a preset threshold value, the image flatness determination unit 84 may determine that the image data is data which denotes a flat image.

In addition, the information processing execution unit 85 may perform, as information processing which the information processing execution unit 85 executes, processing for activating an application associated with the latest input image data stored in the memory or processing for displaying additional information associated with the input image data.

Heretofore, the invention of the present application was described with reference to the exemplary embodiments and examples, but the invention of the present application is not limited to the above-described exemplary embodiments and examples. With respect to the configuration and details of the invention of the present application, various changes which those skilled in the art can understand may be made within the scope of the invention of the present application.

This application claims priority to Japanese Patent Application No. 2012-235336 filed on Oct. 25, 2012, the entire contents of which are incorporated by reference herein.

INDUSTRIAL APPLICABILITY

The present invention is suitably applied to a user interface in which an information terminal equipped with a camera is moved closer to an object such as a poster or a magazine to activate an application associated with the object.

REFERENCE SIGNS LIST

1 Information terminal
2 Server
101 Camera image input unit
102 Central processing unit
103 Temporary storage unit
104 Storage unit
105 Display unit
106 Vibration detection unit
107 Communication unit

What is claimed is:

1. An information processing device comprising:
a camera image input unit configured to input imaged image data;
one or more processors acting as an image collation unit configured to determine whether input image data inputted by the camera image input unit matches pre-registered image data or a feature quantity of the input image data matches a pre-registered feature quantity of the image data, and stores in a memory at least one of input image data which is determined to match and information which represents the input image data;
the one or more processors acting as a complexity computing unit configured to compute complexity of the input image data;
the one or more processors acting as an image flatness determination unit configured to determine, on the basis of the computed complexity of the image data, whether the image data is data which denotes a flat image; and
the one or more processors acting as an information processing execution unit configured to execute, when it is determined by the image flatness determination unit that newly input image data, provided by the camera image input unit, is data which denotes a flat image and the input image data or the information which represents the input image data is stored in the memory, information processing specified by the input image data or the information which represents the input image data stored in the memory.

2. The information processing device according to claim 1, further comprising:
the one or more processors acting as a rest state determination unit configured to determine whether the camera image input unit is in a rest state, wherein
when it is determined that the newly input image data is data which denotes a flat image and it is determined that the camera image input unit is in the rest state, the information processing execution unit executes information processing specified by the input image data or the information which represents the input image data stored in the memory.

3. The information processing device according to claim 2, wherein
when it is determined that the camera image input unit is in the rest state, the image collation unit temporarily stores input image data which is not determined to match or a feature quantity of the input image data, and when it is determined that the newly input image data is data which denotes a flat image and the input image data or the information which represents the input image data is not stored in the memory, the information processing execution unit transmits the temporarily-stored input image data to a server capable of retrieving various types of information required when the own information processing device performs information processing on the basis of an image to be inputted or a feature quantity of the image, and executes information processing specified by information notified from the server.

4. The information processing device according to claim 1, wherein
the image collation unit computes the feature quantity of the input image data inputted by the camera image input unit, and determines whether the feature quantity of the input image data matches the pre-registered feature quantity of the image data.

5. The information processing device according to claim 1, wherein
when the computed complexity of the image data is equal to or less than a preset threshold value, the image flatness determination unit determines that the image data is data which denotes a flat image.

6. The information processing device according to claim 1, wherein
the information processing execution unit performs, as information processing which the information processing execution unit executes, processing for activating an application associated with the latest input image data stored in the memory or processing for displaying additional information associated with the input image data.

7. An information processing method comprising:
determining whether input image data from a camera image input unit which inputs imaged image data matches pre-registered image data or a pre-registered of the input image data matches a feature quantity of the image data;
storing in a memory at least one of input image data which is determined to match and information which represents the input image data;
computing complexity of the input image data;
determining, on the basis of the computed complexity of the image data, whether the image data is data which denotes a flat image; and
executing, when it is determined that newly input image data, provided by the camera image input unit, is data which denotes a flat image and the input image data or the information which represents the input image data is stored in the memory, information processing specified by the input image data or the information which represents the input image data stored in the memory.

8. The information processing method according to claim 7 comprising:
determining whether the camera image input unit is in a rest state; and
executing, when it is determined that the newly input image data is data which denotes a flat image and it is determined that the camera image input unit is in the rest state, information processing specified by the input image data or the information which represents the input image data stored in the memory.

9. A non-transitory computer readable recording medium which stores an information processing program which causes a computer to execute:
image collation processing for determining whether input image data from a camera image input unit which inputs imaged image data matches pre-registered image data or a feature quantity of the input image data matches a pre-registered feature quantity of the image data, and storing in a memory at least one of input image data which is determined to match and information which represents the input image data;
complexity computing processing for computing complexity of the input image data;
image flatness determination processing for determining, on the basis of the computed complexity of the image data, whether the image data is data which denotes a flat image; and
information processing execution processing for executing, when it is determined that newly input image data, provided by the camera image input unit, is data which denotes a flat image in the image flatness determination processing and the input image data or the information which represents the input image data is stored in the memory, information processing specified by the input image data or the information which represents the input image data stored in the memory.

10. The non-transitory computer readable recording medium according to claim 9, wherein the information processing program causes a computer to execute:
rest state determination processing for determining whether the camera image input unit is in a rest state; and
when it is determined that the newly input image data is data which denotes a flat image and it is determined that the camera image input unit is in the rest state, information processing specified by the input image data or the information which represents the input image data stored in the memory in the information processing execution processing.

* * * * *